United States Patent
Smeltzer et al.

(10) Patent No.: US 10,183,620 B1
(45) Date of Patent: Jan. 22, 2019

(54) DETECTION AND ALERT SYSTEM FOR AN ATV WITH ATTACHED PLOW

(71) Applicants: Steve Norman Smeltzer, Spokane, WA (US); Norman Douglas Smeltzer, St.Maries, ID (US)

(72) Inventors: Steve Norman Smeltzer, Spokane, WA (US); Norman Douglas Smeltzer, St.Maries, ID (US)

(*) Notice: Subject to any disclaimer, the term of this patent is extended or adjusted under 35 U.S.C. 154(b) by 0 days.

(21) Appl. No.: 15/959,144

(22) Filed: Apr. 20, 2018

(51) Int. Cl.
*E01H 5/06* (2006.01)
*B60Q 9/00* (2006.01)
*B60Q 5/00* (2006.01)

(52) U.S. Cl.
CPC .............. *B60Q 9/00* (2013.01); *B60Q 5/005* (2013.01); *E01H 5/066* (2013.01); *B60Q 2900/30* (2013.01)

(58) Field of Classification Search
CPC .......... B60Q 9/00; B60Q 5/005; E01H 5/066; E01H 5/06; B60W 10/00
USPC ......... 340/438, 425.5; 701/36, 49; 172/2, 63
See application file for complete search history.

(56) References Cited

U.S. PATENT DOCUMENTS

| | | | | | |
|---|---|---|---|---|---|
| 3,960,362 | A | * | 6/1976 | Griffiths | B66D 3/18 254/276 |
| 5,949,330 | A | * | 9/1999 | Hoffman | B60K 37/02 340/438 |
| 6,135,421 | A | * | 10/2000 | Bartelme | B66D 1/56 254/268 |
| 6,320,497 | B1 | * | 11/2001 | Fukumoto | B60K 35/00 340/425.5 |
| 6,334,269 | B1 | * | 1/2002 | Dilks | E01H 5/06 172/63 |
| 6,464,390 | B1 | * | 10/2002 | Baroche | G04G 17/08 368/1 |
| 7,284,743 | B1 | * | 10/2007 | Brighton | B66D 1/485 242/534 |
| 7,686,095 | B2 | * | 3/2010 | Batthala | A01B 63/1117 172/2 |
| 8,585,021 | B2 | * | 11/2013 | Elliott | E02F 3/848 254/268 |
| 10,093,523 | B2 | * | 10/2018 | Averill | B66D 1/00 |
| 2004/0183526 | A1 | * | 9/2004 | Galbreath | G01D 5/145 324/207.2 |
| 2009/0105911 | A1 | * | 4/2009 | Okeson | E02F 3/7609 701/49 |
| 2015/0105974 | A1 | * | 4/2015 | Kleve | B60W 10/00 701/36 |

* cited by examiner

*Primary Examiner* — Albert K Wong

(57) ABSTRACT

A detection and alert system for use with plows and implements is a system generally referring to off-road vehicles such as ATV's and UTV's and comprising a plow system with a detection device in communication with an alert device. A lifting device, such as a winch, is mounted on the front portion of an ATV or UTV for the purpose of raising and lowering the plow blade. When the operator of the ATV raises the plow, a detection device attached to the plow system alerts the operator via alert device, attached to the front portion of the ATV, the gap or distance remaining between the plow system and the ATV or component thereof.

9 Claims, 4 Drawing Sheets

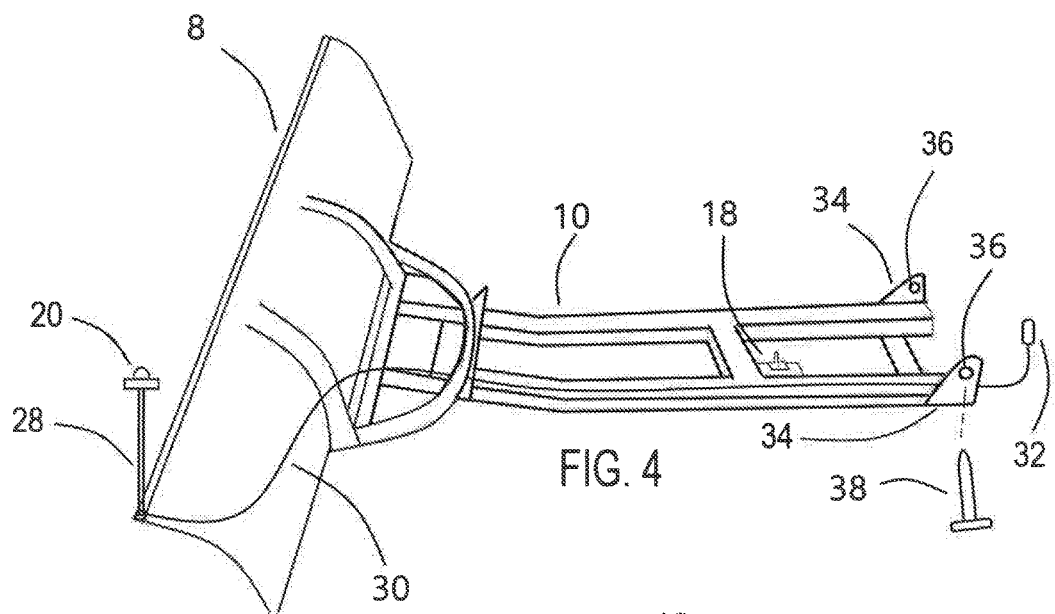
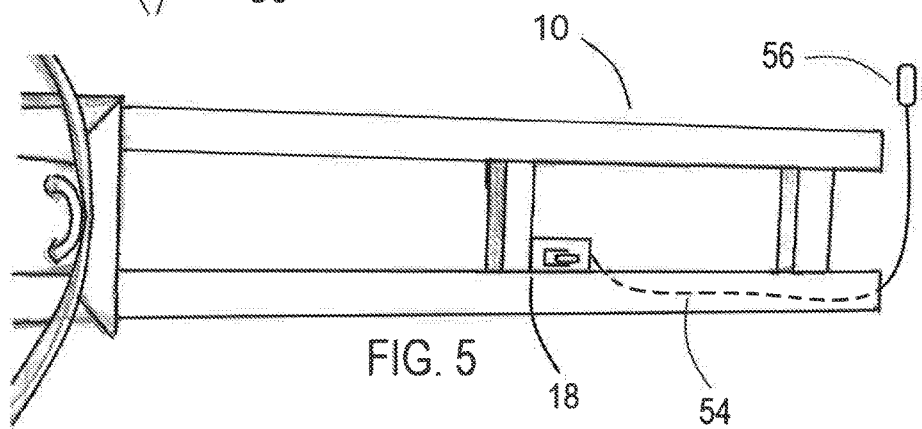
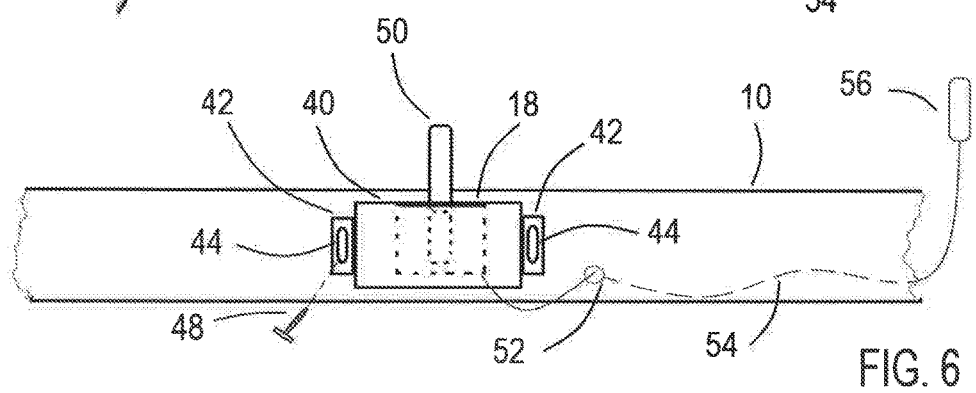

DETECTION AND ALERT SYSTEM FOR AN ATV WITH ATTACHED PLOW

FIELD OF THE INVENTION

The present invention relates generally to plows and implements associated with all-terrain vehicles equipped with a lifting device such as winch, and more particularly a system to alert the operator of a negative condition generated by the lifting device.

BACKGROUND OF THE INVENTION

In recent years the ATV industry has become increasingly popular. As technology has advanced, more and more people are not only using them for recreation but also for the utilitarian advantages the vehicles now offer. One of the most popular forms of this exist in the snow plow industry where nearly every ATV is capable of mounting a snow plow or like implement to the vehicle for the purpose of clearing snow or performing a blade operation such as pushing sand or gravel and the like. Often times the operators of the ATV's have little or no previous knowledge or experience using these devices and since this is not necessarily meant to be the main function of the ATV or UTV there are significant problems and challenges that exist.

There are many different brands and configurations of snow plows designed specifically for ATV's and UTV's. Most all having an elongated frame structure that extents from the rearward end of the blade and then is attached to a mounting plate or bracket approximately mid-point and on the underside of the ATV. These frames generally consist of a pair of elongated tubular members and are commonly known as "push tubes" in the ATV industry, as their name would imply, as the structure used in conjunction with a vehicle to move the implement. The push tubes are able to pivot at the connection point of the ATV for the purpose of raising and lowering the front end of the plow assembly by a lifting device, such as an electric winch mounted on the front end of the ATV. A cable or rope from the winch is connected just behind the rear of the plow blade and is used to facilitate the lifting and lowering of the plow. Other means of lifting and lowering the blade include, hydraulics and other type of electric motors. Regardless the means of lifting, nearly all the plows attached to ATV's and UTV's are challenged with minimal vertical distance between the underside of the ATV and the push tubes. Given the size and stature of most ATV's, it is crucial that the operator raise the plow blade to maximum height when not in plowing mode. This allows for the most distance from the blade to the ground and creates a more favorable condition when backing the ATV or traveling forward any distance.

When the plow is raised by the ATV operator, by winch or other means, the minimal vertical distance can cause the operator to easily "over-raise" or "over-wind" the lifting mechanism causing the push tubes to contact the underside of the ATV with unnecessary and excessive force. This negative condition puts the entire plowing system under pressure, but most particularly the winch cable.

The electric winch mechanism was one of the first modern methods used to raise and lower the blade and is still the most often used today. The problem most often associated with the winch and snow plow combination is the breaking of the winch cable. One factor that can be attributed to the breaking of the winch cables is the over-raising and over winding of the winch during the blade raising procedure. The problem exists where the operator of the ATV does not know exactly when to release the inward operation of the winch control mechanism and consequently the push tubes, attached to the plow blade and connected to the underside of the ATV, will be pulled up into the underside of the vehicle. With no further vertical distance remaining, the push tubes are compressed to the underside while the winch cable or rope is then stretched to the breaking point. Often times the operator will be doing what is referred to in the industry as "ramping up" the snow. This requires the operator to incrementally raise the blade or wind-in the winch cable while the ATV is moving and engaged in the plowing procedure. It is extremely difficult for the operator to determine just how much lift remains creating a perfect opportunity to once again overstress the system by raising the plow higher than the push tubes will allow. During the plowing procedure, this same scenario is played out over and over continually placing undo pressure on the entire plowing system and winch cable. Even over a short period of time the cable or material on the winch drum becomes weak and will eventually break. A great many operators report multiple cable breaks in a single plowing session. The repair can be both difficult and frustrating, especially in cold snowy conditions.

To address the problem of broken winch cables, many operators began using a variety of alternative materials to replace or to splice in front of the winch cable. Synthetic rope has gained popularity for its ease of repair when broken however, the operator is still left with the same dilemma of not knowing exactly when to abort the raise procedure on the lifting device. Yet others use rubber stops to put on the winch cable to cushion the impact of over-winding the winch during the lifting procedure. This method may have some positive attributes however the operator is still left with the same dilemma and in some cases this device can be counterproductive as it tends to shorten the lift span.

As it relates more generally to ATV's with plows, inventions such as U.S. Pat. No. 8,585,021 B2, slack rope and lift control for use with plow, refers to a limiter switch operatively in association with a frame and winch used to control the raise and lowering functions of a working implement. This disclosure relates to mechanisms and systems that function to stop the flow of current to the winch when a certain height threshold is reached. The present disclosure differs in that a switch or a detection device is used to detect similar condition, however does not rely on mechanical arrangements to interact with the winch or lifting device.

Other inventions disclose sophisticated detection and interface systems such as Patent Application US 2015/0105974 A1, Snow Plow Blade Detection and Compensation System, refers more generally to larger vehicles and plows and more specifically to an integrated system comprising a complex touchscreen with voice and gesture recognition capability. Further, this system has an extensive focus on tracking and recording vehicle behavior and conditions.

Still other inventions in the form of additional lights are provided to increase visibility and define certain areas of the plow system. U.S. Pat. No. 6,464,380 B1, Lighted Blade Guides for a Snow Plow, discloses elongated plow corner markers in the form of lights. The present invention will disclose an alert light capable of being positioned on the forward end of the ATV or plow system for the primary purpose of providing signal to the operator as it pertains to a certain condition of the plow system. In this form, the small in stature light of the present invention, is versatile and mobile and can be adaptable to operator preference as it relates to his viewing location. Further, the alert light of the present invention, is enabled and disabled by and through a detection device that is in direct association with the plow system and lifting device. Therefore, the alert light could be secured on the corner of a plow or atop a pedestal for the purpose of providing an alert signal to the operator however, to function as a corner marker would be a bi-product of one preferred embodiment of the present invention.

BRIEF SUMMARY OF THE INVENTION

A brief summary of the present invention is disclosed and described more particularly in one form in order to convey the essence of the invention however, it is not intended to limit the scope of the invention to one particular form or configuration.

The present invention discloses a system associated with plows and implements coupled to an all-terrain vehicle with a winch or similar lifting device operable to the plow system. The detection and alert system of the present invention, provides an alert to the operator when the plow system has reached a predetermined height and therefor able to avoid a negative condition associated with the plowing operation.

A detection device is coupled to a plow frame assembly or push tubes for the purpose of transferring a signal to a visual or audible alert device. An alert device can be strategically located on the front portion of the ATV and within the peripheral or direct vision of the operator. An alert is given to the operator just prior to the plow frame or push tubes making contact to the ATV thus giving the operator notice and time to abort the raise function on the lifting mechanism control.

In one form the system can include, but is not limited to, a momentary-on push button style plunger switch coupled to one elongated structure associated with the plow push tubes. The switch is configured in a way to connect with the ATV, or component thereof, when the plow blade is raised by the operator. As the plunger is compressed, it functions as a switch to enable the alert device for illumination. The illuminated device indicates to the operator the height of the push tubes relative to the ATV. The operator then has sufficient time to release the raise mechanism and avoid a negative over-wind or over raise condition.

A preferred embodiment of the present invention is a simple, easy to use, detection and alert system that is adaptable to existing plows and implements or can be easily integrated into newly manufactured plows and implements.

The detection and alert system disclosed in the present invention addresses a widely recognized problem that exists in the ATV industry in a way not recognized by prior art. In another form, as the gap or distance between the ATV and push tubes diminishes, an easy to see and recognize alert is provided to the operator of the ATV, via a red indicator light positioned on the forward end of the ATV. Instead of relying on a mechanical device to stop the winch or raise mechanism, the operator will simply know when to abort the raise function on the control associated with the winch thereby preventing the plow system from compressing into the ATV. The invention disclosed herein, provides the operator a simple and effective system to prevent unintentionally over-raising the plow system via a winch and cable or other lifting methods.

One exemplary objective of the present invention is to extend the life of the plowing system and most notably the cable or rope associated with a working lift device such as a winch. While the operator is engaged in the lifting process of the plow, the detection and alert system work in unison to alert the operator the plow system is near maximum height.

BRIEF DESCRIPTION OF THE DRAWINGS

The brief description of drawings will refer to corresponding components of the system generally for illustrated purposes only. The present invention will be more fully understood from the detailed description and claims.

FIG. 4 is an elevated side view of an exemplary plow system and shown with an alert device and detection device both in association with the plow system.

FIG. 5 is a top view of an exemplary detection device in association with the push tubes.

FIG. 6 is an exploded side view of a detections device in association with a cut-out section of the push tubes. The detection device is shown in an exemplary form with the plunger button extending beyond the leading edge of the cut-out section of push tubes. The detection device can exist in multiple forms however, to best convey the essence of the present invention, the detection device most often referred to will be described in the form of a momentary-on plunger switch.

DETAILED DESCRIPTION OF THE INVENTION

Figure 1:
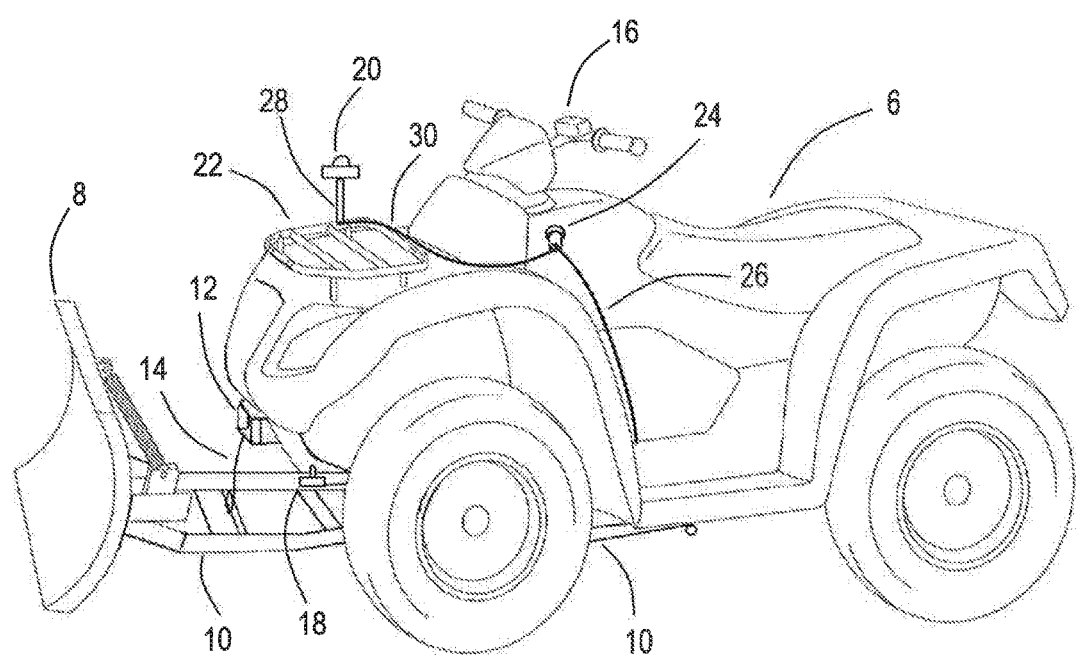
FIG. 1 is a perspective view of an ATV with attached plow system, winch assembly and showing exemplary embodiments of the present invention.

Although the following description of the present invention relates more specifically to vehicles such as ATV's and UTV's, it should be understood and appreciated that certain embodiments of the present invention disclosed herein can be applicable to other vehicles, machinery and systems.

Further, it will be apparent to those skilled in the art, that the present invention can be supported by a wide variety of well-known and similarly operative components, configured to different types of plows and ATV's, to accomplish exemplary objectives of the present invention.

An exemplary embodiment of the present invention is a versatile detection and alert system as it relates to the plows, implements, ATVS's and an operator. For example, some plows are mounted directly to the front of an ATV and although when raised and lowered they hinge in a different location, it will be apparent to those skilled in the art that the system disclosed herein can be adapted to a wide variety of implements and their mounting variations such as a front or forward mount plow. Further, the term "push tubes" will refer to the apparatus linking the implement to the ATV and is not meant to be limiting in its description or disqualify other structures, materials or means thereof used to connect the plow or implement to the ATV, and further having a direct association to one or more of the preferred or other certain embodiments of the present invention.

It will further be apparent and understood to those skilled in the art, that the location and configuration of both the alert device and the detection device will only be limited by the type of plow, ATV, and operator preference. Exemplary embodiments are disclosed and shown in one form to provide a clear and concise understanding as to what is new, different and useful in the present invention and should not be construed to limit the scope of the disclosure.

Further, it is meant to be understood that there are many different well-known devices and technologies that can support the functions of the detection device disclosed in the present invention. Devices such as, but not limited to, all types of switches, to include hall effect, sensors and relays can be used to detect proximity of the plow or implement to the ATV, ground, or other structure and return a signal to the alert device in accordance with present invention.

In another form of the disclosed invention a sensor, switch or relay device can detect the proximity of the ground to the push tubes or plow and send a signal to the operator, via alert device, so as to prevent another well know negative condition referred to as "slack rope" or expelling more rope from the winch than is necessary. This negative condition occurs when the ATV operator does not know exactly when to release the downward function of the lift control mechanism. Further in this form, the alert device can be in the form of two lights such as a green light and red light to indicate to the ATV operator the optimum vertical positioning of the plow while performing the raise and lowering procedures associated with a winch or other lifting devices.

Further, the detection device can be positioned and mounted using many different and well-known attachment apparatuses and fasteners such as, but not limited to, brackets, clamps, magnets and adhesives. Additionally, the detection device can be encapsulated in its own mounting bracket so as to provide a method of attachment and to protect the device from negative conditions associated with the weather and other harsh working environments. A spring or cushioning element can also be included and positioned in a way, associated with the type of mount, to absorb pressure from contact to the ATV, ATV component, or object in accordance with the teachings of the present invention.

Conversely, there are many well-known devices and technologies that can support the functions of the alert device. Components such as, but not limited to, lights, instruments, gages and other similar devices can be used to alert or inform the operator of an ATV, or similar vehicle, certain negative conditions or positioning of a plow system or implement. Exemplary embodiments of the alert device are disclosed more particularly in one form but should not be construed to limit the scope and spirit of the invention.

Further, it will be apparent to those skilled in the art, and familiar with the corresponding industry, that there are many existing mounting devices both brand specific and universal, used in conjunction with a wide variety of accessories which can include the alert device disclosed in the present invention. Many such accessory mounting devices are adjustable and rotatable and can be attached to a cargo rack or other forward areas of an ATV. In one form, the body structure of the alert device can be configured to easily link with an existing mounting device and then be attached to a desired location on the forward end of the ATV. In yet another form, an alert device can have a body structure and an adjustable fastening component of its own. One exemplary embodiment of the present invention will describe the alert device in the form of illumination, or an indicator light that will function as the alert signal to the operator of an ATV. Although it may not be illustrated in the following drawings, it should be understood that the light used, in the system of the present invention, can have many forms of structure for attachment and placement on the forward end of the ATV. Further, it is meant to be understood that the system disclosed in the present invention can utilize all forms and configuration as it relates to structure, mounting, and presentation of the illumination device on the forward end of the ATV for the purpose of providing signal to the operator.

The following drawings and description depict and describe a more conventional form of the present invention using an electrical circuit. To avoid unnecessary duplicate description, it should be understood and appreciated that this in no way is meant to disqualify the present invention from any form of wireless technology, or similar technology that may be used in conjunction with the spirit and intent described in the present invention. Additionally, detection device and alert device will be described and illustrated most often in one form. The following illustrations are meant to convey the essence of the system disclosed of the present invention but are not meant to limit the application, uses, or components.

With reference to FIG. 1 an exemplary ATV 6 is shown with attached plow system 8 comprising two elongated members referred to as push tubes 10, wherein push tubes 10 are further connected to the underside of the ATV 6. The preferred location of a winch 12 is shown on the front portion of ATV 6 with winch cable 14 attached to the forward end of plow system 8. Winch control mechanism 16 in exemplary configuration with ATV 6, is operatively associated with winch 12 to facilitate lifting and lowering the plow system 8.

Further in FIG. 1, a preferred embodiment of the present invention includes a detection device in the form of a momentary-on plunger switch 18 in association with push tubes 10 and an alert device in the form of an indicator light 20 and comprising an optional pedestal 28 in association with cargo rack 22. ATV 6 comprising a 12-volt auxiliary power port 24 operable with circuit 30 and further operable with circuit 26.

Figure 2:
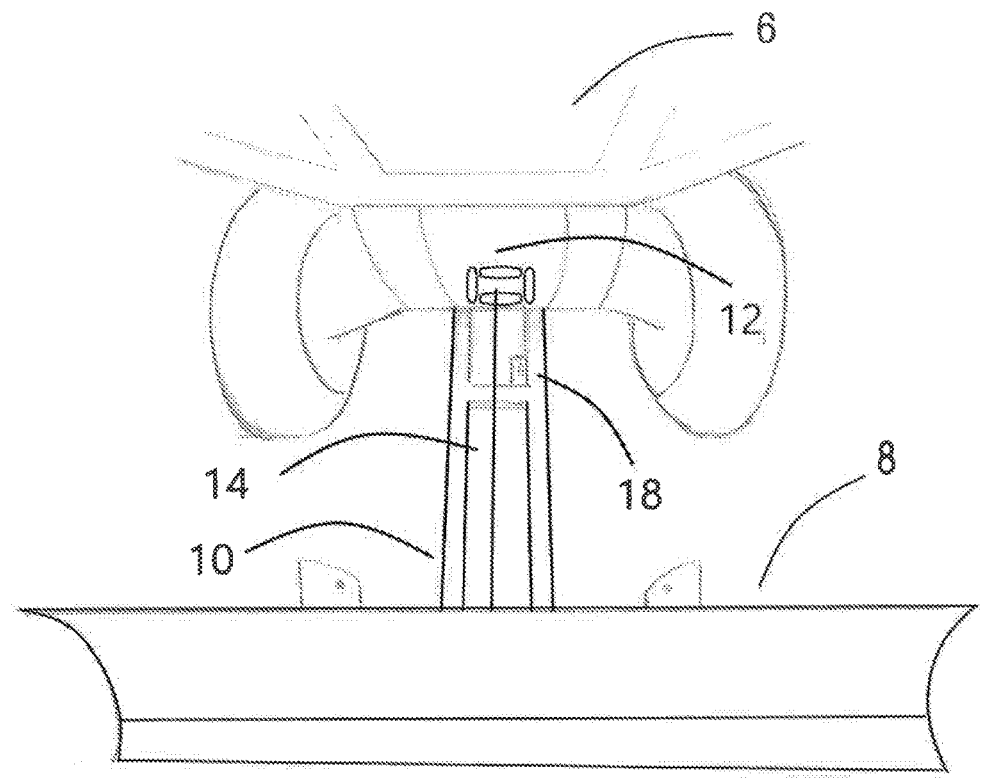
FIG. 2 is a front view of an ATV with a plow system and winch assembly. The plow assembly is shown with push tubes extending from the plow blade and to the underside of the ATV and further comprising an exemplary detection device in association with the push tubes.

Referring now to FIG. 2 a front view of ATV 6 and plow system 8 is provided for perspective as it relates to the communication between the plunger switch 18 and the underside of ATV 6. Plow system 8 connected to push tubes 10 are shown extended from the underside of the ATV 6. Although not shown, push tubes 10 can be secured to a previously installed mounting plate or bracket approximately mid-point and on the bottom side of ATV 6. This form of attachment provides a hinge point to facilitate lifting the front of plow system 8. The plunger switch 18 is shown in an exemplary configuration and operatively associated with push tubes 10, plow system 8, winch 12, winch cable 14 and ATV 6.

Figure 3:
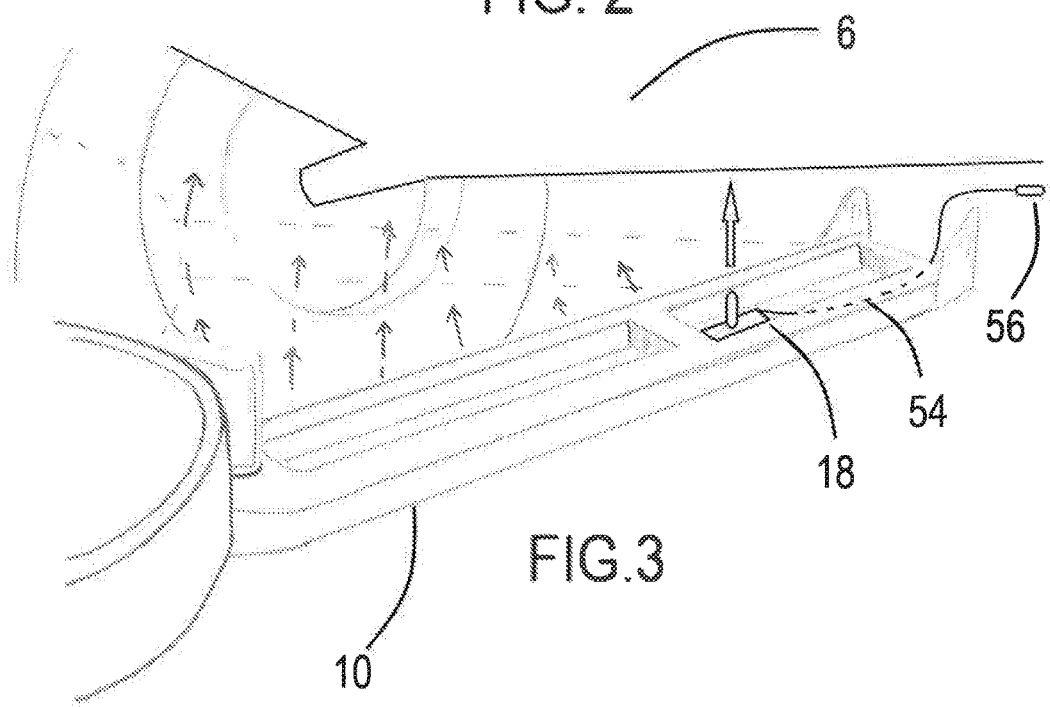
FIG. 3 is an exploded front corner view of an ATV with exemplary detection device in association with the push tubes and arrows to illustrate the upward motion of the push tubes and detection device. Another arrow illustrates the manner in which the plunger button will be activated via contact with the underside of an ATV.
Figure 7:
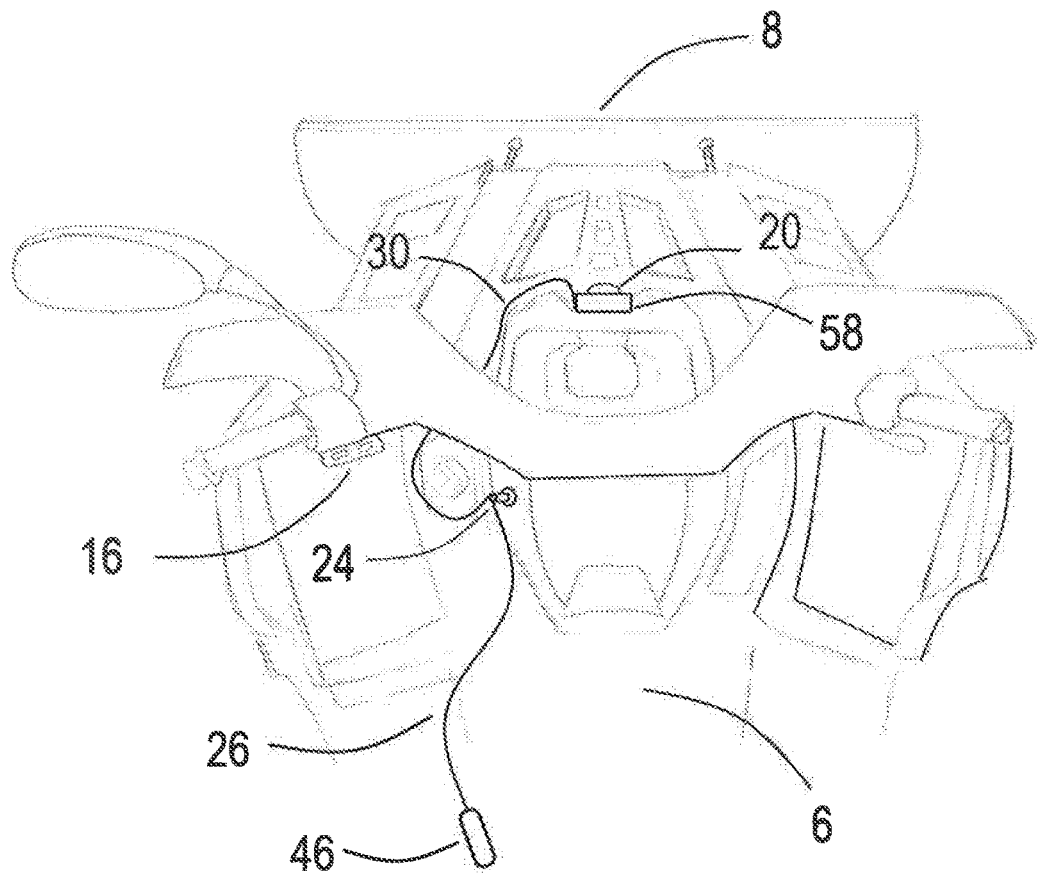
FIG. 7 is an elevated and forward-facing view as would be seen by the ATV operator. An exemplary form of the alert device is shown on the front of the ATV and in a preferred location for the operator. Circuitry from the alert device and detection device is shown leading to an auxiliary power port on the ATV.

FIG. 3 is an exploded front corner view of ATV 6 wherein push tubes 10 are shown in working orientation with plunger switch 18. Arrows are provided to demonstrate the upward direction push tubes 10 will move and further transport plunger switch 18 for activation and connection with the underside of ATV 6. As plunger switch 18 is compressed, the switch functions in a momentary-on capacity and further enabling signal via circuit 54 and connection fitting 56 to the indicator light 20, as shown in FIGS. 1, 4 and 7, for illumination. The illumination providing an operator information regarding the distance remaining between the push tubes 10 and the underside of ATV 6. By releasing the winch control mechanism 16, as best shown in FIG. 7, the indicator light retains illumination and a small desirable gap is provided between the push tubes 10 and the underside of the ATV 6. The opposite, of the above described, occurs during a downward motion of the push tubes 10.

FIG. 4 is an elevated side view of plow system 8 connected to push tubes 10 and plunger switch 18 mounted on the inside of one elongated member of push tubes 10. Further in FIG. 4 plow system 8 comprising indicator light 20 attached to one foremost front corner and indicator light 20 comprising optional pedestal 28. As previously stated, the system according to the disclosed invention, can be supported by many existing technologies and apparatuses such as a pedestal and means of attachment and further placed in a desired location by an operator. Indicator light 20, as shown in this form, with circuitry 30 can traverse a path alongside or inside the tubular construction of push tubes 10 and further comprising connection fitting 32 at the rearward end of push tubes 10. The connection fitting 32 enables connection and disconnection to further circuitry and provides convenience as it relates to installing and removing plow system 8. With further reference to FIG. 4 push tubes 10 having two upwardly protruding lobes 34 to facilitate attachment to a mounting bracket on the underside of an ATV. Both lobes 34 with aperture's 36 receive a pin 38 to secure push tubes 10 to a previously installed mounting plate on the underside of an ATV. A mounting plate is configured to receive such lobes, or a similar configuration, simultaneously, thus providing a hinge point at the rear of a plow system when the front portion of a plow system is raised and lowered by a winch or other lifting device.

FIG. 5 is an elevated view with plunger switch 18 associated with push tubes 10. Plunger switch 18 is illustrated in an exemplary configuration and on the inside of one tubular member of push tubes 10. However, plunger switch 18 can be located and secured along any inside or outside structure of, or associated with, push tubes 10 to further enable proper alignment and activation with a structure of an ATV or component thereof when a plow system in raised. Although push tubes 10 facilitate a preferred form of the present invention, plunger switch 18 can be mounted anywhere on a plow system to facilitate the system of the disclosed invention. Plunger switch 18 is further shown in conjunction with circuitry 54, of a preferred length, inside one tubular member of push tubes 10 wherein circuitry 54 exits the rearward end of push tubes 10 and comprising a connection fitting 56 to enable further circuitry.

In FIG. 6 a side view of plunger switch 18 is shown in an exemplary configuration with a cut-out section of push tubes 10. The plunger switch 18 is depicted inside housing 40 with housing 40 comprising tabs 42 on opposite sides to facilitate fastening. The tabs 42 further comprising oblong shaped aperture's 44 to allow for vertical adjustment of the housing 40 and further receive a typical fastener such as a screw 48 for attaching the housing 40 to push tubes 10. Further, the vertical adjustment can be used in conjunction with the plunger button 50, protruding upward and beyond a leading edge of push tubes 10, to acquire the preferred distance for activation wherein plunger button 50 contacting the underside of an ATV or object thereof. The housing 48 can be secured just below the leading edge of push tubes 10 providing a buffer between the push tubes 10 and the ATV 6 as previously shown in FIGS. 2 and 3. Additionally, this leaves a small amount of compression distance remaining in the downward movement of plunger button 50. Further, in FIG. 6, push tubes 10 illustrate one form of facilitating circuit 54 from plunger switch 18 to the rearward end of a push tubes 10. Aperture 52, of preferred size, and in close proximity to plunger switch 18, can be drilled into push tubes 10 and further providing an opening for circuit 54 to enter and move down the hollow cavity of the member. The circuit 54 exits the rearward end of one side of a push tubes 10 and further comprising a connection fitting 56 to enable connection and disconnection to further circuitry. Additionally, connection fitting 56 is provided for convenience as it relates to installing and removing a plow or implement system.

FIG. 7 is an elevated and forward-facing view as would be seen by an operator when mounted on the ATV 6, and further exemplifies a preferred embodiment of the present invention. ATV 6 is shown in a slightly different configuration with indicator light 20 positioned on the forward end of ATV 6. Indicator light 20 comprising housing 58 is temporarily attached or placed on a forward end of ATV 6. In this form, indicator light 20 and housing 58 are easily moved and arranged in a configuration associated with ATV 6 and further preferred by an operator. Further in FIG. 7, wherein plow system 8 is raised by an operator via winch control 16, and wherein indicator light 20 producing illumination that is easily seen by an operator. Additionally, in FIG. 7 wherein circuit 30, operable with indicator light 20, is linked to the 12-volt auxiliary port 24. Circuit 26 is also shown linked to auxiliary port 24 and further comprising connection fitting 46 to facilitate circuitry associated with plunger switch 18 as depicted previously in FIG. 5 and FIG. 6.

Figure 8:
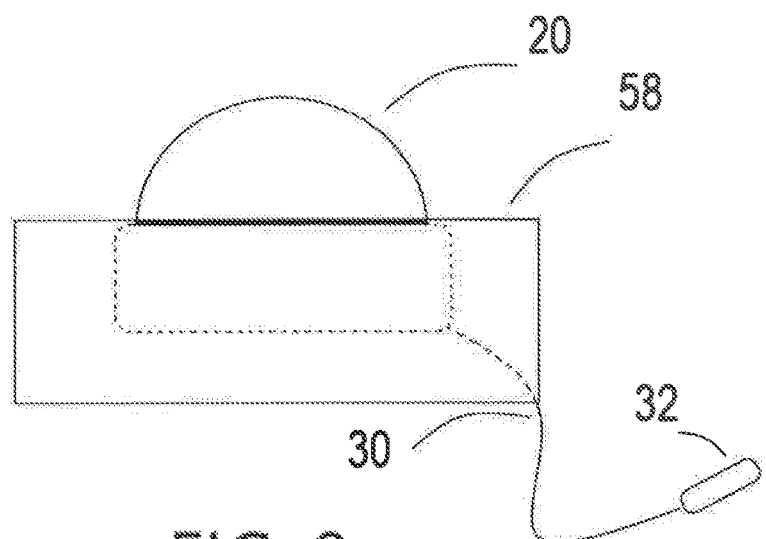
FIG. 8 is an exploded side view of an exemplary alert device with a housing for illumination components. The alert device can also exist in many different forms However, to best convey the essence of the present invention, the alert device will be described mostly in the form of an indicator light. The indicator light in FIG. 8 is shown with a circuit and a connection fitting on the opposite end.

FIG. 8 is an exploded side view of indicator light 20 and further used to illustrate and convey the essence of a preferred embodiment of the present invention. Indicator light 20 can be comprised of a housing 58 to provide a method of attachment and protection or can simply function singularly in different forms of illumination. Indicator light 20 is shown with circuit 30 and connection fitting 32 to facilitate further circuitry.

The forgoing is considered as illustrative only and has been presented in a simple and straight forward configuration so as to provide a clear representation of the full scope and spirit of the invention and is not meant to limit the invention to the exact construction and operation shown and described. While preferred embodiments have been presented, certain modifications and devices may be changed or substituted without departing from the scope of the disclosed invention.

What is claimed:

1. A plow with an alert system, comprising:
    a plow assembly including a blade and push tubes connected to the blade wherein the assembly is connectable to an ATV or UTV vehicle;
    a winch connected to the assembly and connectable to the ATV or UTV wherein the winch raises and lowers the assembly with respect to a ground;
    a sensor connected to the plow assembly to detect a distance between the sensor and a portion of the ATV or UTV, or the ground, wherein the sensor produces a signal when the assembly is raised to a position wherein the assembly may impact the ATV or UTV or wherein the assembly is raised to a position wherein the winch cable may be damaged; and a visual indicator connected to the sensor wherein the indicator is activated upon receipt of the sensor signal.

2. The plow with an alert system as recited in claim 1, wherein the sensor is a Hall sensor with a corresponding magnet, or a switch.

3. The plow with an alert system as recited in claim 1, further comprising the ATV or UTV wherein the assembly and the winch are connected to the ATV or UTV.

4. The plow with an alert system as recited in claim 3, wherein the visual indicator is an instrument or gauge on the ATV or UTV.

5. The plow with an alert system as recited in claim 1, wherein the visual indicator produces a color or changes the color upon the receipt of the sensor signal.

6. The plow with an alert system as recited in claim 3, wherein the visual indicator is located at a location on the ATV or UTV that is visible to an operator operating the plow.

7. The plow with an alert system as recited in claim 1, wherein the sensor is attached using an element from the group consisting of brackets, clamps, magnets and adhesive.

8. The plow with an alert system as recited in claim 1, wherein the sensor further comprises a spring or cushioning element.

9. The plow with an alert system as recited in claim 1, further comprising a second indicator that displays the distance detected by the sensor.

\* \* \* \* \*